UNITED STATES PATENT OFFICE.

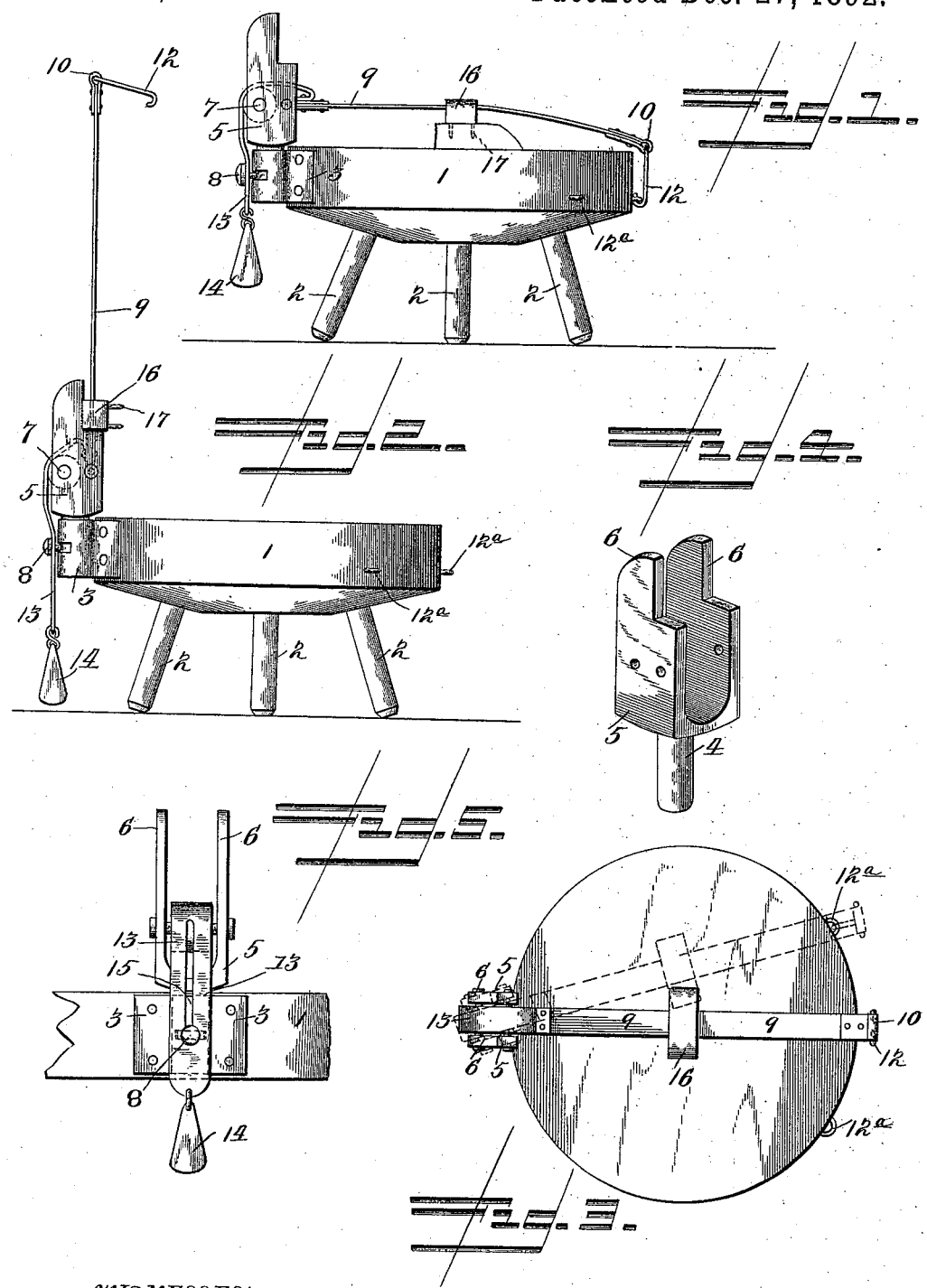

BENJAMIN P. COBB, OF ODESSA, MISSOURI.

MEAT-BLOCK ATTACHMENT.

SPECIFICATION forming part of Letters Patent No. 488,870, dated December 27, 1892.

Application filed June 25, 1892. Serial No. 438,002. (No model.)

*To all whom it may concern:*

Be it known that I, BENJAMIN P. COBB, a citizen of the United States, and a resident of Odessa, in the county of Lafayette and State of Missouri, have invented certain new and useful Improvements in Meat-Block Attachments; and I do hereby declare that the following is a full, clear, and exact description of the invention, which will enable others skilled in the art to which it appertains to make and use the same, reference being had to the accompanying drawings, which form a part of this specification.

My invention relates to improvements in attachments for butchers' blocks, whereby a piece of meat can be securely clamped and held thereon, during the operation of cutting or sawing and the clamp be automatically thrown up out of the way when released.

The invention consists in the novel construction and combination of parts hereinafter fully described and claimed.

In the accompanying drawings: Figure 1 is a side elevation of a butcher's block with my improved attachment applied thereto and showing a piece of meat clamped thereby; Fig. 2 is a similar view, the clamp being shown therein up out of the way; Fig. 3 is a plan view of the device in the position shown in Fig. 1; Figs. 4 and 5 are detail views.

In the said drawings the reference numeral 1 designates an ordinary butcher's block mounted upon legs 2, as usual. Secured to the block is a bracket 3, within which fits a short cylindrical upright or standard 4, provided at its upper end with a head 5, formed with two upwardly projecting arms 6, in which is journaled a roller 7. This upright, the head and the arms are preferably made integral or in one piece of wood, metal or other suitable material, and the upright is provided with a headed pin 8, projecting through a slot in the bracket. The upright 4 is capable of oscillating or rotating in the bracket so as to adjust the clamp in different positions with respect to the center of the block, as shown by dotted lines in Fig. 3.

Journaled in the arms 6 is a clamp 9, consisting of a flat strip of spring metal, which extends diametrically across the block, and its free end bent upon itself forming a loop 10, in which is pivoted a catch or arm 12, having its end bent into a hook, which is adapted to engage with staples $12^a$ attached to the block. To the opposite end of the clamp near the journals thereof is secured a strap 13, which passes over the roller 7, and at its free end is provided with a weight 14, and intermediate of its ends is formed with a slit or opening 15, with which the headed pin 8, engages.

Mounted upon the clamp 9 is a sliding block 16, having a slot, through which the clamp passes. The underside of this block is provided with a series of pins 17, which engage with the meat to be held. The upper inner sides of the arms 6 are recessed or cut away to receive the sliding block when the clamp is thrown up, and thus limit the movement of the same.

The operation is as follows: The meat is placed upon the block and the clamp brought down so that the block will rest upon the meat and the pins engage with or penetrate the same. The hooked arm 12 is then engaged with the staple $12^a$ whereby the meat is securely clamped to the block, allowing the same to be cut or sawed without liability of slipping. When the hooked arm is disengaged from the staple to release the meat the clamp will be thrown up into a perpendicular position by means of the weighted strap, so as to be out of the way, and is held in such position by passing the headed pin through the slit or opening therein. As the clamp is thus thrown up the sliding block will fall down and engage with the recessed ends of the arms 6, to limit the movement of the clamp.

The attachment can be applied to any ordinary butcher's block, and the meat can be securely held thereon, thus permitting the operator to use both hands in cutting, sawing or trimming the same.

Having thus described my invention, what I claim is,

1. The combination with a butcher's block having a series of staples on its periphery and a bracket secured thereto, of the upright journaled in said bracket, the spring clamp pivoted to said upright and provided with a catch adapted to engage with said staples and a slidable block carried by said clamp, substantially as described.

2. The combination with a butcher's block having a series of staples on its periphery and a bracket, of the upright journaled in said bracket, the spring clamp pivoted to said block and provided with a catch adapted to engage with said staples, the slidable block carried by said clamp, and the weighted strap secured to said clamp for automatically throwing the clamp out of engagement with the meat when the clamp is released, substantially as described.

3. The combination with a butcher's block, of the bracket secured thereto, provided with a slot, the upright fitting in said bracket, the head, the upwardly projecting arms secured at their upper inner sides, the roller, the spring clamp pivoted or journaled in said arms, extending across the block and provided at its free end with a catch, the slidable block mounted on said clamp, the weighted strap having a slit or opening, secured to said clamp and the headed pin secured to the upright and passing through the slot in the bracket, substantially as described.

4. The combination with a butcher's block, of the bracket having a slot therein, the oscillating upright provided with a headed pin passing through said slot, the clamp pivotally connected to the upwardly extending arms formed with or secured to said upright, the slidable block on the clamp and the catch connected with said clamp and the staples secured to the block, substantially as described.

In testimony that I claim the foregoing as my own I have hereunto affixed my signature in presence of two witnesses.

BENJAMIN P. COBB.

Witnesses:
HUGH STRAIN,
CHAS. R. CREASEY.